United States Patent
Paquin et al.

(10) Patent No.: US 10,830,062 B2
(45) Date of Patent: Nov. 10, 2020

(54) SINGLE PLY HAVING PLURALITY OF FIBER ANGLES

(71) Applicant: UNITED TECHNOLOGIES CORPORATION, Farmington, CT (US)

(72) Inventors: Bradley L. Paquin, Cheshire, CT (US); Nicholas D Stilin, Higganum, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 213 days.

(21) Appl. No.: 15/926,370

(22) Filed: Mar. 20, 2018

(65) Prior Publication Data

US 2019/0292921 A1   Sep. 26, 2019

(51) Int. Cl.

| | | |
|---|---|---|
| *F01D 5/28* | (2006.01) |
| *B29C 70/38* | (2006.01) |
| *F04D 29/02* | (2006.01) |
| *F01D 5/14* | (2006.01) |
| *F04D 29/32* | (2006.01) |
| *B29C 70/22* | (2006.01) |
| *B29L 31/08* | (2006.01) |

(52) U.S. Cl.
CPC ............ *F01D 5/282* (2013.01); *B29C 70/228* (2013.01); *B29C 70/382* (2013.01); *F01D 5/147* (2013.01); *F04D 29/023* (2013.01); *F04D 29/324* (2013.01); *B29L 2031/082* (2013.01); *F05D 2220/36* (2013.01); *F05D 2230/31* (2013.01); *F05D 2230/50* (2013.01); *F05D 2240/30* (2013.01); *F05D 2250/38* (2013.01); *F05D 2300/6034* (2013.01)

(58) Field of Classification Search
CPC ....... F01D 5/282; F01D 5/147; B29C 70/228; B29C 70/382; F04D 29/023; F04D 29/324; F05D 2220/36; F05D 2230/31; F05D 2230/50; F05D 2240/30; F05D 2250/38; F05D 2300/6034
See application file for complete search history.

(56) References Cited

U.S. PATENT DOCUMENTS

| | | |
|---|---|---|
| 8,714,226 B2 | 5/2014 | Senibi et al. |
| 9,249,530 B2 | 2/2016 | Yoon et al. |
| 9,289,949 B2 | 3/2016 | Kismarton |
| 9,797,257 B2 | 10/2017 | Kray et al. |

(Continued)

FOREIGN PATENT DOCUMENTS

WO    2015034630    3/2015

OTHER PUBLICATIONS

European Patent Office, European Sear Report dated Jul. 25, 2019 in Application No. 19163748.7.

*Primary Examiner* — Aaron R Eastman
(74) *Attorney, Agent, or Firm* — Snell & Wilmer L.L.P.

(57) ABSTRACT

A composite airfoil is disclosed. The composite airfoil includes a first ply having a first plurality of strips of fiber oriented at a first angle with respect to a longitudinal axis and a second plurality of strips of fiber oriented at a second angle with respect to the longitudinal axis at least a first subset of the first plurality of strips of fibers have fibers intersecting and oriented at an angle to the fibers in at least a second subset of the second plurality of strips of fibers within a ply boundary.

20 Claims, 6 Drawing Sheets

(56) References Cited

U.S. PATENT DOCUMENTS

| | | | |
|---|---|---|---|
| 2011/0259515 A1* | 10/2011 | Rotter | B29C 70/382 |
| | | | 156/285 |
| 2016/0076552 A1* | 3/2016 | Anderson | B29C 70/382 |
| | | | 416/230 |
| 2016/0108746 A1* | 4/2016 | Riehl | B29C 70/22 |
| | | | 60/805 |
| 2016/0250749 A1* | 9/2016 | Gan | B29C 70/386 |
| | | | 74/90.05 |
| 2017/0306976 A1 | 10/2017 | Thomas | |
| 2018/0251921 A1 | 9/2018 | Shi | |

* cited by examiner

SINGLE PLY HAVING PLURALITY OF FIBER ANGLES

FIELD

The present disclosure relates generally to composite components and, more particularly, to composite airfoil and fan blade components used in gas turbine engines and methods of manufacturing such components.

BACKGROUND

Composite materials offer potential design improvements in gas turbine engines. In recent years, for example, composite materials have been replacing metals in gas turbine engine fan blades because of their high strength and low weight. Many metal gas turbine engine fan blades are titanium. The ductility of titanium fan blades enables the fan to incur a bird strike and remain operable or be safely shut down. Composite fan blades should withstand bending stresses, torsional stresses, interlaminar stresses, and in-plane stresses and strains from typical operation and from impacts by foreign objects.

SUMMARY

A composite airfoil for use in a gas turbine engine is disclosed. In various embodiments, the composite airfoil includes a first ply having a first plurality of strips of fiber oriented at a first angle with respect to a longitudinal axis and a second plurality of strips of fiber oriented at a second angle with respect to the longitudinal axis.

In various embodiments, the composite airfoil includes a root region and a tip region and the first ply extends along the composite airfoil from the root region to the tip region. In various embodiments, the composite airfoil defines a spanwise direction and the longitudinal axis extends substantially parallel to the spanwise direction. In various embodiments, the first angle is about zero degrees. In various embodiments, the second angle is about ninety degrees. In various embodiments, the root region includes a subset of the first plurality of strips of fiber. In various embodiments, the tip region includes a subset of the second plurality of strips of fiber. In various embodiments, the tip region includes a first subset of the first plurality of fibers and a second subset of the second plurality of strips of fiber.

In various embodiments, the composite airfoil includes a second ply having a third plurality of strips of fiber oriented at the first angle and a fourth plurality of strips of fiber oriented at the second angle, the second ply stacked adjacent the first ply. In various embodiments, the first plurality of strips of fiber includes at least one strip of fiber that is staggered a longitudinal offset from an adjacent strip of fiber in the third plurality of strips of fiber. In various embodiments, the second plurality of strips of fiber includes at least one strip of fiber that is staggered a lateral offset from an adjacent strip of fiber in the fourth plurality of strips of fiber.

In various embodiments, the first plurality of strips of fiber comprises carbon prepreg. In various embodiments, each strip of fiber within the first plurality of strips of fiber has a first width equal to about one-eight inch to about one-quarter inch. In various embodiments, each strip of fiber within the second plurality of strips of fiber has a second width equal to about one-eight inch to about one-quarter inch.

A method of forming a composite fan blade is disclosed. In various embodiments, the method includes loading a prepreg material in a form of strips into an automated fiber placement ("AFP") machine, positioning a composite tooling mold having a fan blade shape relative to the AFP machine. In various embodiments, the method includes fabricating a first ply by placing a first plurality of strips of prepreg on a surface of the mold by manipulating a mold position relative to the AFP machine and placing a second plurality of strips of prepreg on the surface of the mold by manipulating the mold position relative to the AFP machine. In various embodiments, at least a first subset of the first plurality of strips of prepreg has fibers intersecting and oriented perpendicular to the fibers in at least a second subset of the second plurality of strips of prepreg.

In various embodiments, the method includes fabricating a second ply stacked upon the first ply by placing a first adjacent plurality of strips of prepreg on a ply surface defined by the first ply by manipulating the mold position relative to the AFP machine and placing a second adjacent plurality of strips of prepreg on the ply surface defined by the first ply by manipulating the mold position relative to the AFP machine. In various embodiments, at least a first subset of the first adjacent plurality of strips of prepreg has fibers intersecting and oriented perpendicular to the fibers in at least a second subset of the second adjacent plurality of strips of prepreg.

In various embodiments, the method includes repeatedly fabricating plys, stacked upon one another, until a layup of the composite fan blade is complete. In various embodiments, the first plurality of strips of prepreg includes at least one strip of prepreg that is staggered a longitudinal offset from an adjacent strip of prepreg in the first adjacent plurality of strips of prepreg. In various embodiments, the second plurality of strips of prepreg includes at least one strip of prepreg that is staggered a lateral offset from an adjacent strip of prepreg in the second adjacent plurality of strips of strips. In various embodiments, a multi-axis robot is used to position the composite tooling mold relative to the AFP machine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
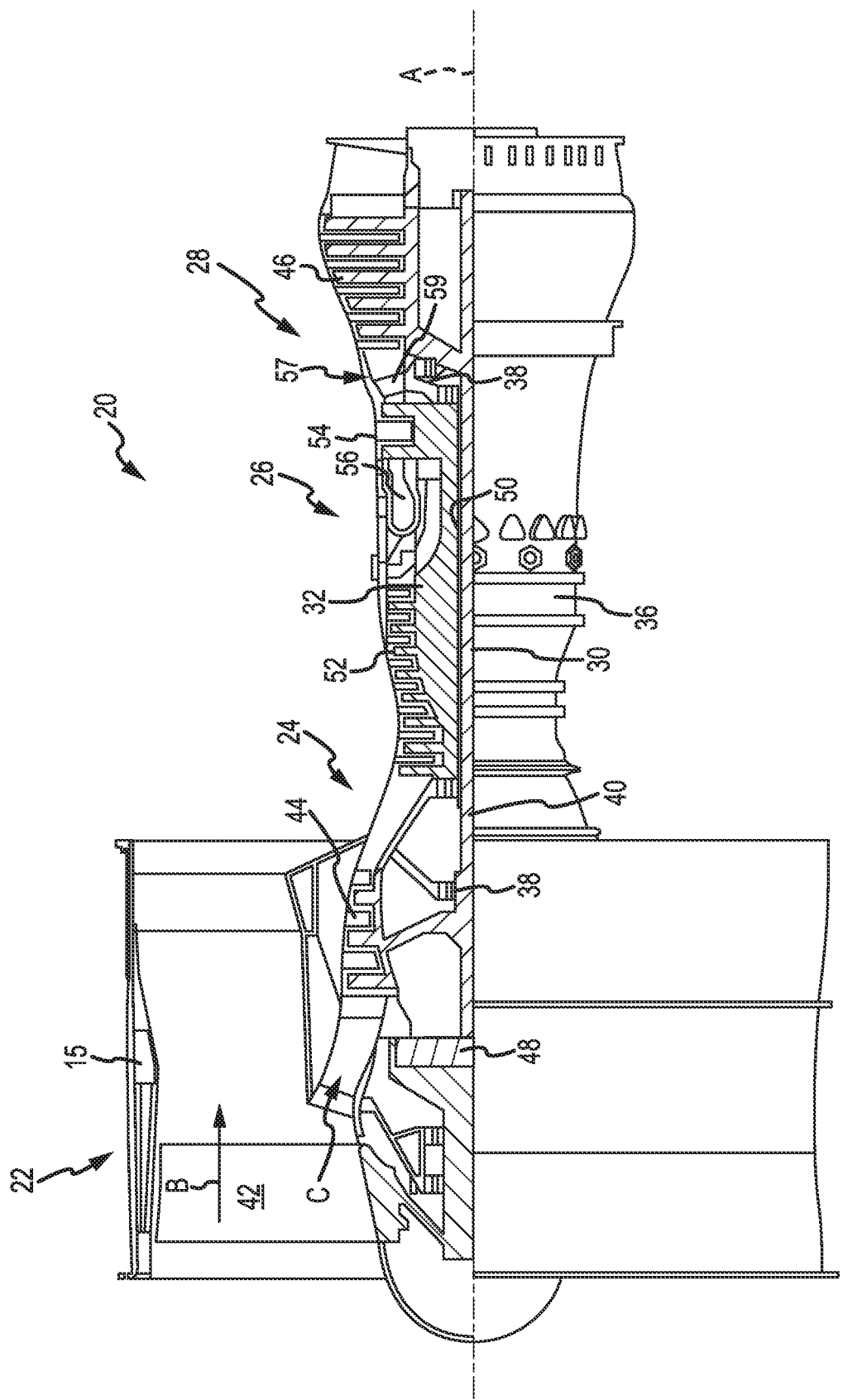
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2:
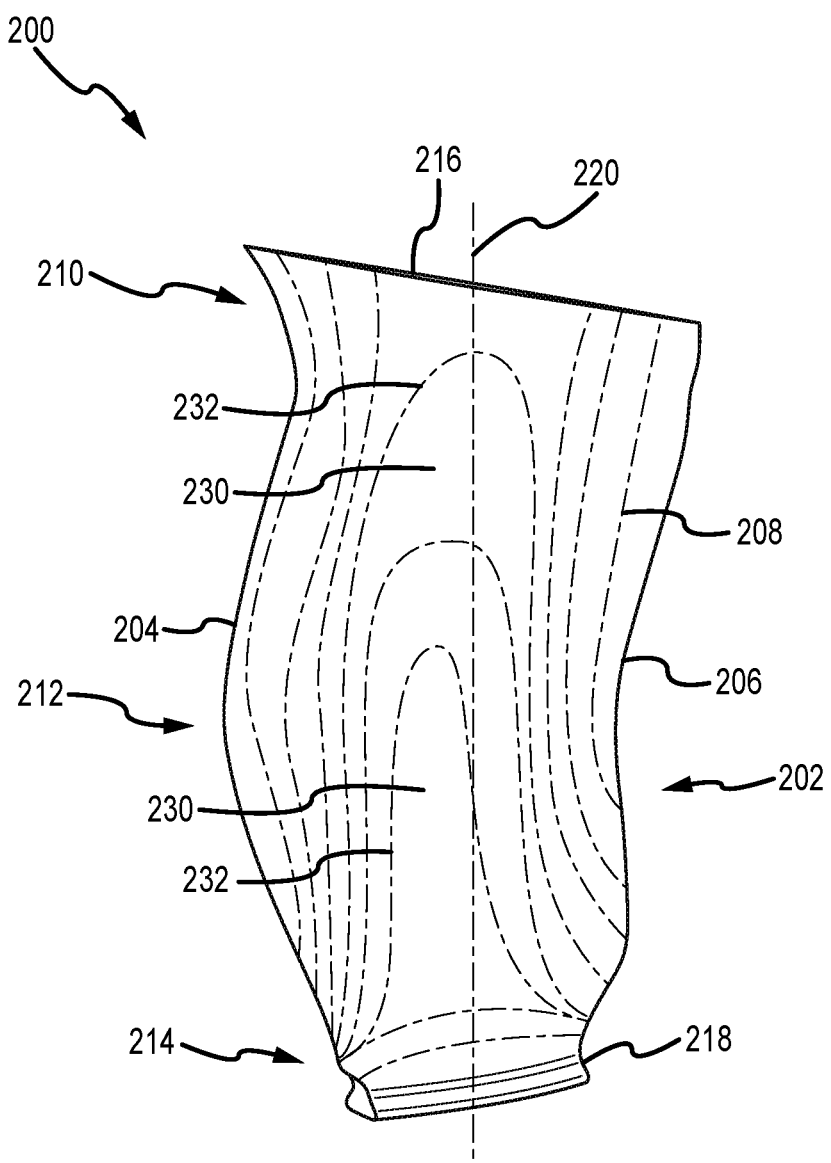
FIG. 2 is a perspective view of a composite fan blade, in accordance with various embodiments.

Referring now to FIG. 2, a composite fan blade 200 is illustrated, in accordance with various embodiments. The composite fan blade 200 is illustrative of one of a plurality of blades in the fan 42 described above with reference to FIG. 1. In various embodiments, the composite fan blade 200 includes an airfoil 202, having a leading edge 204, a trailing edge 206, a suction side 208 that is a generally convex surface, a pressure side that is a generally concave surface, a tip region 210, and intermediate region 212 and a root region 214. In various embodiments, the tip region 210 includes a tip 216 and the root region includes a root 218. A longitudinal axis 220 may extend generally along a spanwise direction from the root 218 to the tip 216.

The composite fan blade 200 generally comprises a plurality of plies 230 which, in various embodiments, resemble two-dimensional sheets of composite material stacked upon each other. Each of the plurality of plies 230 generally exhibits a ply boundary 232 that defines the outer boundary or perimeter of the two-dimensional sheet. As described in further detail below, each of the plurality of plies 230 generally includes elongated fibers extending there through at specific orientations. More specifically, the elongated fibers within each ply may be oriented at different angles with respect to a reference direction—e.g., the longitudinal axis 220—at different regions within the ply to satisfy differing strength or stiffness requirements within the various regions of the ply. This feature of the disclosure contrasts with techniques that employ either a unidirectional or uniweave fiber orientation throughout the ply.

Figure 3A:
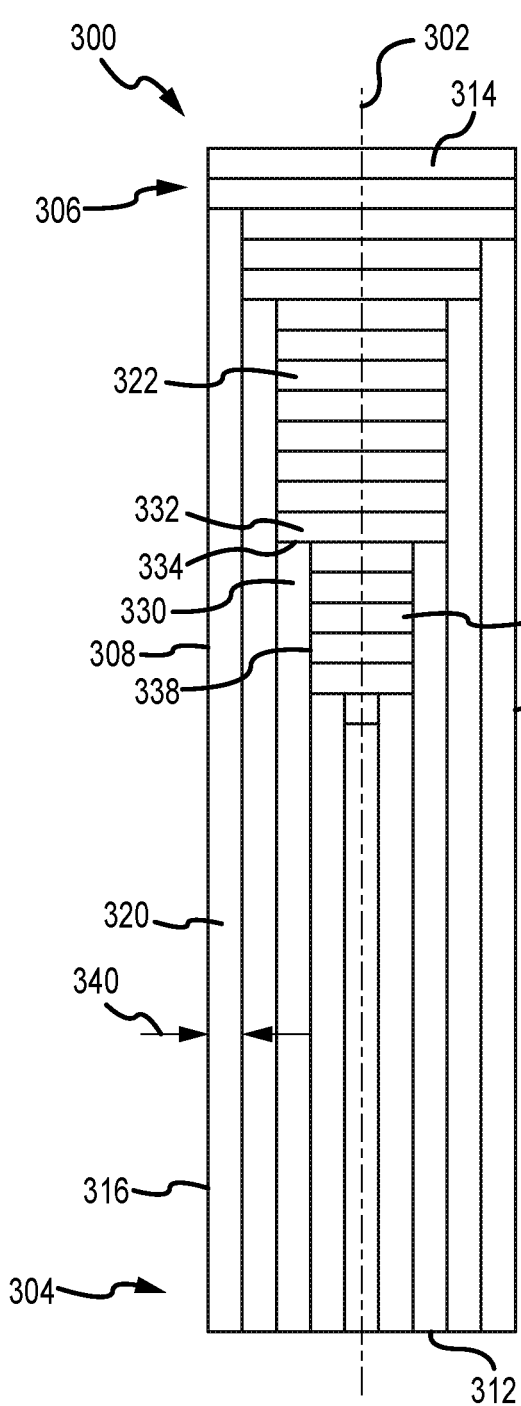
FIGS. 3A and 3B are schematic views of composite ply layups, in accordance with various embodiments.
Figure 3B:
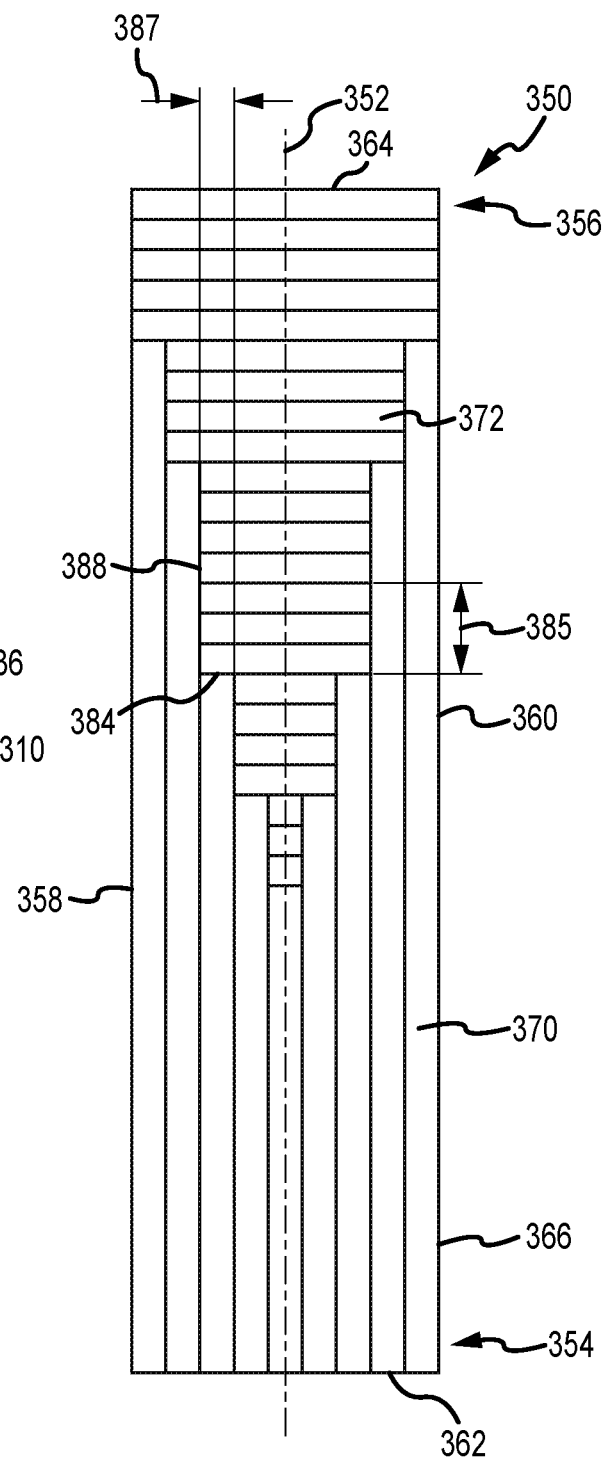

Referring now to FIGS. 3A and 3B, schematic views of fiber orientations within single plies is illustrated. For example, referring to FIG. 3A, a first ply 300 is illustrated, generally in the form of a rectangle for purposes of description. Relating the first ply 300 to the composite fan blade 200, described above with reference to FIG. 2, the first ply 300 may be considered to include a longitudinal axis 302 extending from a root region 304 to a tip region 306, a leading edge boundary 308, a trailing edge boundary 310, a root boundary 312 and a tip boundary 314. A first ply boundary 316, corresponding to the ply boundary 232, described above with reference to FIG. 2, is comprised of the leading edge boundary 308, the trailing edge boundary 310, the root boundary 312 and the tip boundary 314. While the first ply 300 and its corresponding first ply boundary 316 are schematically illustrated in the shape of a rectangle having straight sides or straight boundary edges, the disclosure contemplates curved sides and curved boundary edges, such as those accompanying each ply boundary 232 illustrated in and described above with reference to FIG. 2.

Still referring to FIG. 3A, the first ply 300 comprises various pluralities of first strips 320, each having unidirectional fibers oriented in a first direction (e.g., zero degrees (0°) with respect to the longitudinal axis 302), and second strips 322, each having unidirectional fibers oriented in a second direction (e.g., ninety degrees (90°) with respect to the longitudinal axis 302). Each of the first strips 320 and the second strips 322 may comprise pre-impregnated ("prepreg") composite material, such as, for example, HexTow® IM8 or HexPly® M91, available from Hexcel Corporation. Prepreg composite materials may have a layer of fibers, such as, for example, carbon fibers, generally aligned in a single direction and impregnated with a resin, such as, for example, an epoxy resin. The strips within any particular ply, such as the first ply 300, may be oriented at different angles within different regions throughout the ply to satisfy varying structural requirements within the different regions. For example, in the vicinity of the root region 304, greater strength (e.g., tensile strength) in a radial direction (e.g., a direction parallel to the longitudinal axis 302) is more preferable than strength in a hoop or circumferential direction (e.g., a direction transverse to the longitudinal axis 302). Accordingly, the strips in the root region 304 assume an orientation similar to the orientation of the first strips 320 which, in various embodiments, is about zero degrees (0°) with respect to the longitudinal axis 302. Similarly, in the vicinity of the tip region 306, greater strength in a hoop or circumferential direction (e.g., a direction transverse to the longitudinal axis 302) is more preferable than strength in the radial direction (e.g., a direction parallel to the longitudinal axis 302). Accordingly, the strips in the tip region 306 assume an orientation similar to the orientation of the second strips 322 which, in various embodiments, is about ninety degrees (90°) with respect to the longitudinal axis 302.

Still referring to FIG. 3A, various members of the first strips 320 and various members of the second strips 322 intersect one another in perpendicular fashion, without the appearance of gaps or spaces between the intersecting strips. For example, a first zero-degree strip 330 intersects a first ninety-degree strip 332 along a first common intersection line 334, which is oriented about ninety degrees (90°) with respect to the longitudinal axis 302. Similarly, a second ninety-degree strip 336, together with the two adjoining strips above and the two adjoining strips below the second ninety-degree strip 336, intersect the first zero-degree strip 330 along a second common intersection line 338. In various embodiments, the lack of gaps or spaces between intersecting strips is facilitated through use of prepreg materials having a width 340 that is uniform or constant. For example, the HexTow® IM8 or HexPly® M91 materials referred to above may be procured on rolls having strip widths of about one-eight (⅛) inch (3.175 mm), one-quarter (¼) inch (6.35 mm) and one-half (½) inch (12.7 mm). The uniform width of each of the first strips 320 and the second strips 322 (e.g., the width 340) may be exploited to create plies (e.g., the first ply 300 illustrated in FIG. 3A) having multiple fiber angles within the same ply boundary (e.g., the first ply boundary 316) without the appearance of gaps or spaces between the various intersections of strips of different fiber orientations (e.g., along the first common intersection line 334 and the second common intersection line 338). As described in further detail below, the uniform width of each of the first strips 320 and the second strips 322 facilitates the use of automated fiber placement in fabricating various multiple-fiber angle plies.

Referring now to FIG. 3B, a second ply 350 is illustrated. The second ply 350 includes many of the characteristics that define the first ply 300, including a longitudinal axis 352 extending from a root region 354 to a tip region 356, a leading edge boundary 358, a trailing edge boundary 360, a root boundary 362 and a tip boundary 364. The second ply also includes a second ply boundary 366, which may or may not share the same dimensions as the first ply boundary 316. Similar with the first ply 300, the second ply 350 comprises various pluralities of first strips 370, each having unidirectional fibers oriented in a first direction (e.g., zero degrees (0°) with respect to the longitudinal axis 352), and second strips 372, each having unidirectional fibers oriented in a second direction (e.g., ninety degrees (90°) with respect to the longitudinal axis 352). Each of the first strips 370 and the second strips 372 may comprise the same HexTow® IM8 or HexPly® M91 identified above. The second ply 350 also includes common intersection lines defining regions where strips having different fiber orientations intersect. For example, the second ply 350 includes a first common intersection line 384 and a second common intersection line 388 that are similar to their counterparts referred to in FIG. 3A. As illustrated, however, the counterpart common intersection lines between the first ply 300 and the second ply 350 are offset from one another. For example, the first common intersection line 384 is offset a longitudinal offset distance 385 from its counterpart (i.e., the first common intersection line 334) in the first ply 300. Similar offsets between common intersection lines may be made in the lateral direction. For example, the second common intersection line 388 is offset a lateral offset distance 387 from a portion of its counterpart (i.e., the second common intersection line 338) in the first ply 300. In general, the offsets in a particular ply are selected such that no intersection between strips of different fiber orientation appears in the same location between adjacent plies. Staggering the locations of the intersections facilitates reduction or minimization of local stress concentrations between adjacent plies.

Figure 4:
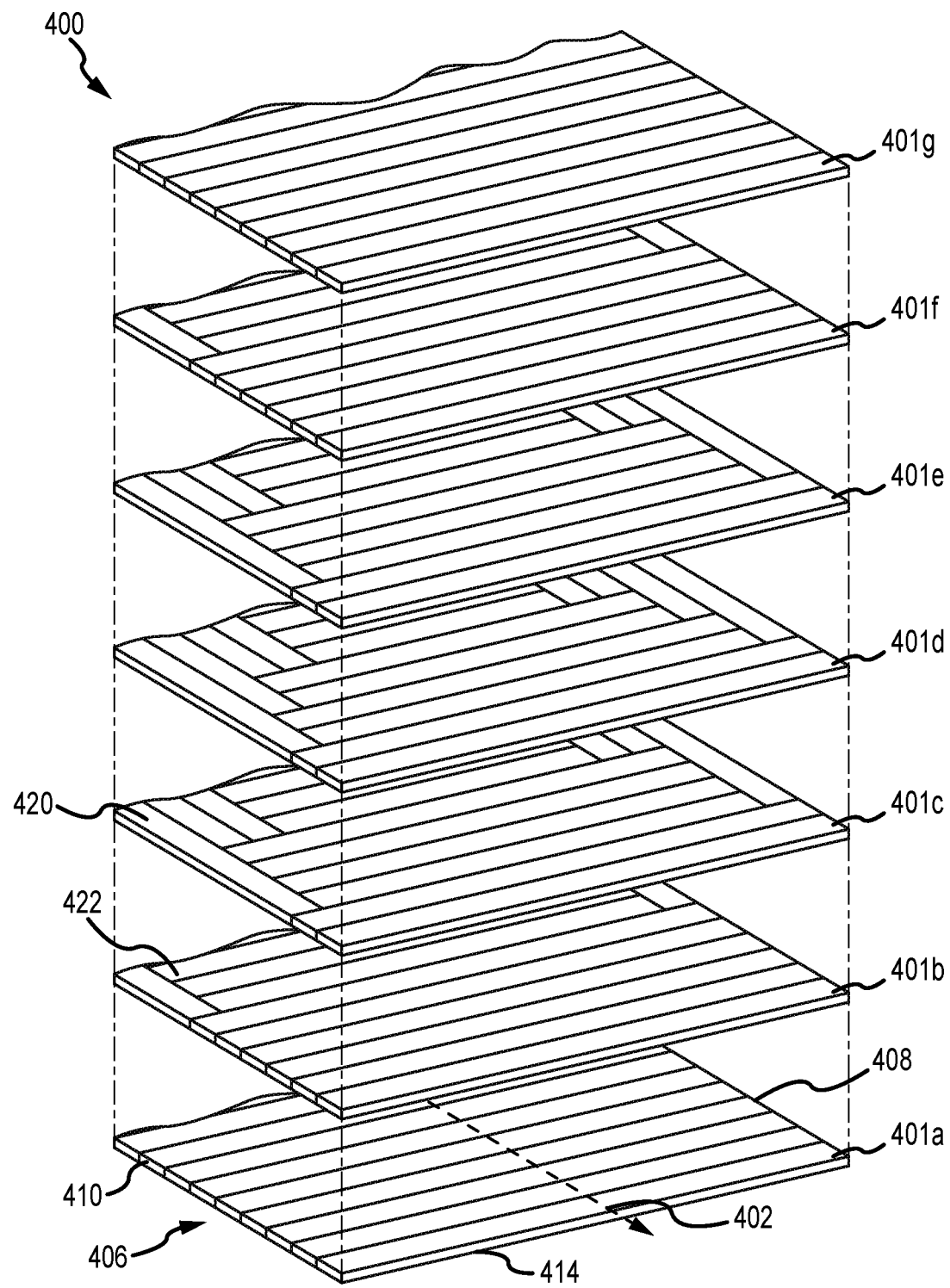
FIG. 4 is an exploded schematic view of several individual plies of a composite laminate, in accordance with various embodiments.

Referring now to FIG. 4, a schematic view of a portion of a ply layup 400 used to fabricate a composite part or portion thereof, such as the tip region 210 of the composite fan blade 200 described above with reference to FIG. 2, is provided. As illustrated, the ply layup 400 includes several plies (e.g., a first ply 401a, a second ply 401b . . . and a seventh ply 401g) stacked in a sandwich-like formation. While the ply layup 400 illustrated in FIG. 4 comprises seven plies, the disclosure contemplates any number of plies. Relating the ply layup 400 to the composite fan blade 200, described above with reference to FIG. 2, each ply (401a-401g) may be considered to comprise a portion of the tip region 210 of the composite fan blade 200. Accordingly, the ply layup 400 may be described as having a longitudinal axis 402 extending from a root region (not shown) to a tip region 406, a leading edge boundary 408, a trailing edge boundary 410, a root boundary (not shown) and a tip boundary 414. Each ply (401a-401g) defines a ply boundary 416 corresponding to the ply boundary 232 described above with reference to FIG. 2. Each ply boundary 416 comprises the leading edge boundary 408, the trailing edge boundary 410, the root boundary (not shown) and the tip boundary 414. As described above with references to FIGS. 3A and 3B, while the ply boundary 416 of each ply (401a-401g) is schematically illustrated in the shape of a rectangle having straight sides or straight boundary edges, the disclosure contemplates curved sides and curved boundary edges, such as those accompanying each ply boundary 232 illustrated in and described above with reference to FIG. 2.

Still referring to FIG. 4, each ply (401a-401g) includes strips of unidirectional fibers, similar to those already described above. For example, the fourth ply 402d includes various pluralities of first strips 420, each having unidirectional fibers oriented in a first direction (e.g., zero degrees (0°) with respect to the longitudinal axis 402), and second strips 422, each having unidirectional fibers oriented in a second direction (e.g., ninety degrees (90°) with respect to the longitudinal axis 402). Similar to the description above with reference to FIGS. 3A and 3B, each ply positioned adjacent another ply includes many of the characteristics that define the former, including common intersection lines defining regions where strips having different fiber orientations intersect and longitudinal and lateral offsets that separate corresponding common intersection lines between adjacent plies. In a multiple-ply layup—e.g., a layup having hundreds of plies—the longitudinal and lateral offsets may comprise the width of a single strip between adjacent plies or the width of several strips between adjacent plies. Similar to the above description, the offsets in a particular ply are selected such that no intersection between strips of different fiber orientation appears in the same location between adjacent plies. Staggering the locations of the intersections facilitates reduction or minimization of local stress concentrations between adjacent plies.

Figure 5:
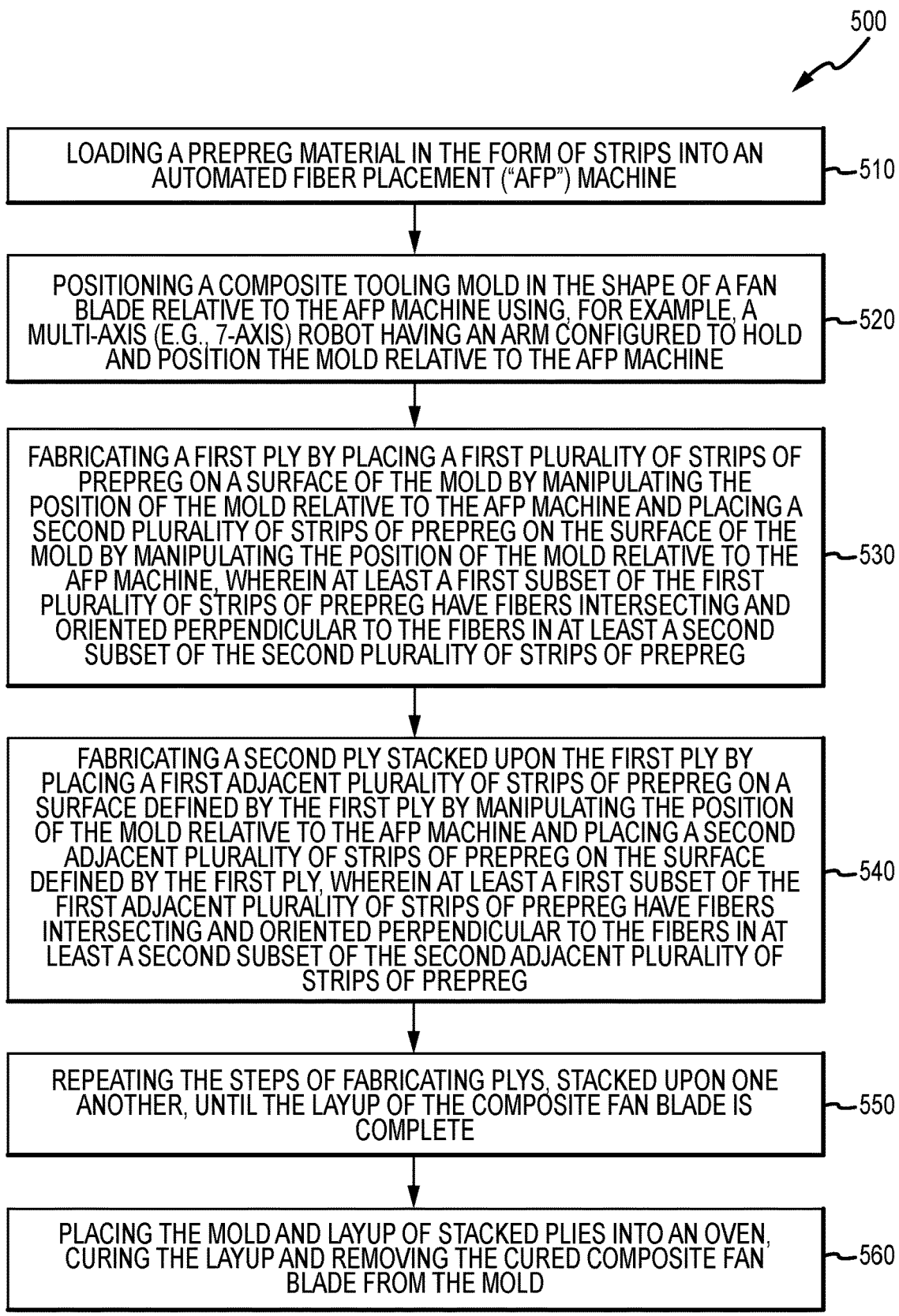
FIG. 5 illustrates a series of steps used fabricate a composite fan blade, according to various embodiments.

Referring now to FIG. 5, a method (500) of forming a composite fan blade, such as the composite fan blade 200 described above with reference to FIG. 2, using the principles and techniques described above with reference to FIGS. 3A, 3B and 4, is described. In various embodiments, the method (500) employs automated fiber placement techniques and associated equipment. In various embodiments, the method 500 generally includes the steps of loading a prepreg material in the form of strips into an automated fiber placement ("AFP") machine (510). Positioning a composite tooling mold in the shape of a fan blade relative to the AFP machine using, for example, a multi-axis (e.g., 7-axis) robot having an arm configured to hold and position the mold relative to the AFP machine (520). Fabricating a first ply by placing a first plurality of strips of prepreg on a surface of the mold by manipulating the position of the mold relative to the AFP machine and placing a second plurality of strips of prepreg on the surface of the mold, whereby at least a first subset of the first plurality of strips of prepreg have fibers intersecting and oriented perpendicular to the fibers in at least a second subset of the second plurality of strips of prepreg (530). Fabricating a second ply stacked upon the first ply by placing a first adjacent plurality (or third plurality) of strips of prepreg on a surface defined by the first ply by manipulating the position of the mold relative to the AFP machine and placing a second adjacent plurality (or fourth plurality) of strips of prepreg on the surface defined by the first ply, whereby at least a first subset of the first adjacent plurality of strips of prepreg have fibers intersecting and oriented perpendicular to the fibers in at least a second subset of the second adjacent plurality of strips of prepreg (540). Repeating the steps of fabricating plys, stacked upon one another, until the layup of the composite fan blade is complete (550). Then, placing the mold and layup of stacked plies into an oven, curing the layup and removing the cured composite fan blade from the mold (560).

Figure 6:
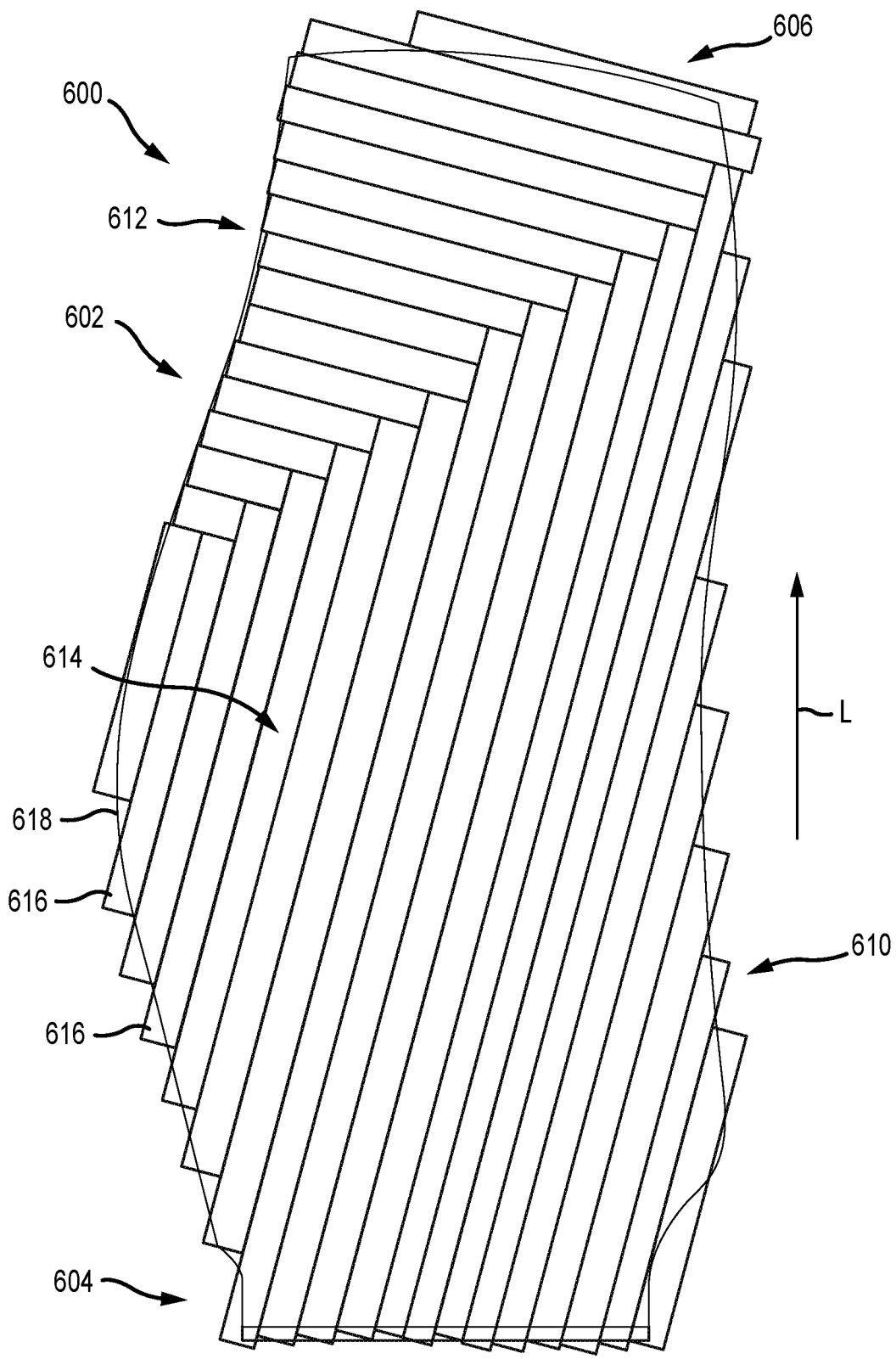
FIG. 6 illustrates a composite fan blade and a ply that is included within a layup of plies that comprise the composite fan blade, in accordance with various embodiments.

The foregoing discloses composite components and methods of making such components. The composite components generally include plies, within a layup of plies, that comprise "prepreg" strips of unidirectional fiber positioned at different fiber angles without creating gaps between the strips. While several of the embodiments above described refer to zero degrees (0°) or ninety degrees (90°) with respect to a reference orientation—e.g., a longitudinal axis or reference—the disclosure contemplates no preferred orientation. In other words, the disclosure contemplates strip orientations with respect to a reference, such as a longitudinal reference, of, for example, minus forty five degrees (−45°) and plus forty five degrees (45°) or fifteen degrees (15°) and one hundred five degrees (105°) or similar orientations obtained by rotation as falling within the scope of the disclosure. For example, referring to FIG. 6, a composite fan blade 600 is illustrated against a ply 602 that is included within a layup of plies that comprise the composite fan blade 600. A longitudinal axis, L, is illustrated running in a generally radial direction from a root region 604 to a tip region 606 of the composite fan blade 600. In various embodiments, the ply 602 is one of several plies included in a layup of plies created during a fabrication process similar to the process described above with reference to FIG. 5.

As illustrated, the ply 602 comprises a first plurality of strips 610 and a second plurality of strips 612. The first plurality of strips 610 each include unidirectional fibers oriented at a first direction (e.g., fifteen degrees (15°)) with respect to the longitudinal axis, L. Similarly, the second plurality of strips 612 each include unidirectional fibers oriented at a second direction (e.g., one hundred five degrees (105°)) with respect to the longitudinal axis, L. As illustrated, the strips comprising both the first plurality of strips 610 and the second plurality of strips 612 are positioned along their respective lengths and at their respective intersections such that no gaps within an interior region 614 of the ply 602 result. This feature is generally a result of the rectilinear or rectangular form of the strips described above with reference to FIGS. 3A and 3B and FIG. 4. Any overhanging portions 616 of the strips occurring at a ply boundary 618 may be removed during the layup process or following the curing process as required. While the foregoing illustrates the strip orientations occurring at fifteen degrees (15°) and one hundred five degrees (105°), the disclosure contemplates any similar orientations by simply rotating an orthogonal ply comprising pluralities of strips as described above. Thus, a composite component, such as the composite fan blade 600, that comprises hundreds of plies within a ply layup may similarly comprise tens or hundreds of ply orientations within the ply layup that comprises the composite component.

While the foregoing disclosure describes its application to composite airfoils and blades, the disclosure contemplates application to any structure comprising a composite layup. Further, while the foregoing often describes orientation of strips of fibers in relation to a longitudinal axis of an airfoil or blade, the disclosure contemplates relation to other points of reference. Further, because a longitudinal axis of an airfoil or blade disposed on a fan may be selected to not correspond precisely with a radial line extending from a central axis of the fan, the disclosure describes various orientations using the term "about" which, in this disclosure, contemplates a tolerance of plus or minus fifteen degrees (15°) from a specified angle or orientation with respect to a reference. In other words, some tolerance is contemplated for instances where a reference axis of the component part may not align precisely with a reference axis of a larger assembly of which the component is a part.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A composite airfoil, comprising:
a first ply having a first plurality of strips of fiber oriented at a first angle with respect to a longitudinal axis and a second plurality of strips of fiber oriented at a second angle with respect to the longitudinal axis,
wherein at least one strip of the first plurality of strips intersects at least one strip of the second plurality of strips at a common intersection line within the first ply and without a gap or a space between the at least one strip of the first plurality of strips and the at least one strip of the second plurality of strips.

2. The composite airfoil of claim 1, wherein the composite airfoil includes a root region and a tip region and wherein the first ply extends along the composite airfoil from the root region to the tip region.

3. The composite airfoil of claim 2, wherein the composite airfoil defines a spanwise direction and wherein the longitudinal axis extends substantially parallel to the spanwise direction.

4. The composite airfoil of claim 3, wherein the first angle is zero degrees.

5. The composite airfoil of claim 4, wherein the second angle is ninety degrees.

6. The composite airfoil of claim 5, wherein the root region comprises at least a subset of the first plurality of strips of fiber.

7. The composite airfoil of claim 5, wherein the tip region comprises at least a subset of the second plurality of strips of fiber.

8. The composite airfoil of claim 5, wherein the tip region comprises a first subset of the first plurality of strips of fiber and a second subset of the second plurality of strips of fiber.

9. The composite airfoil of claim 5, further comprising a second ply having a third plurality of strips of fiber oriented at the first angle and a fourth plurality of strips of fiber oriented at the second angle, the second ply stacked adjacent the first ply.

10. The composite airfoil of claim 9, wherein the first plurality of strips of fiber includes at least one strip of fiber that is staggered a longitudinal offset from an adjacent strip of fiber in the third plurality of strips of fiber.

11. The composite airfoil of claim 10, wherein the second plurality of strips of fiber includes at least one strip of fiber that is staggered a lateral offset from an adjacent strip of fiber in the fourth plurality of strips of fiber.

12. The composite airfoil of claim 2, wherein the first plurality of strips of fiber comprises carbon prepreg.

13. The composite airfoil of claim 2, wherein each strip of fiber within the first plurality of strips of fiber has a first width equal to one-eight inch to one-quarter inch.

14. The composite airfoil of claim 13, wherein each strip of fiber within the second plurality of strips of fiber has a second width equal to one-eight inch to one-quarter inch.

15. A method of forming a composite fan blade, the method comprising:
loading a prepreg material in a form of strips into an automated fiber placement ("AFP") machine;
positioning a composite tooling mold having a fan blade shape relative to the AFP machine; and
fabricating a first ply by placing a first plurality of strips of prepreg on a surface of the mold by manipulating a mold position relative to the AFP machine and placing a second plurality of strips of prepreg on the surface of the mold by manipulating the mold position relative to the AFP machine,
wherein the first plurality of strips of prepreg is oriented at a first angle with respect to a longitudinal axis extending between a root and a tip of the composite fan blade and the second plurality of strips of prepreg is oriented at a second angle with respect to the longitudinal axis,
wherein at least a first subset of the first plurality of strips of prepreg has fibers intersecting and oriented perpendicular to the fibers in at least a second subset of the second plurality of strips of prepreg, and wherein at least one strip of the first plurality of strips of prepreg intersects at least one strip of the second plurality of strips of prepreg at a common intersection line within the first ply and without a gap or a space between the at least one strip of the first plurality of strips and the at least one strip of the second plurality of strips.

16. The method of claim 15, further comprising fabricating a second ply stacked upon the first ply by placing a first adjacent plurality of strips of prepreg on a ply surface defined by the first ply by manipulating the mold position relative to the AFP machine and placing a second adjacent plurality of strips of prepreg on the ply surface defined by the first ply by manipulating the mold position relative to the AFP machine, wherein at least a first subset of the first adjacent plurality of strips of prepreg has the fibers intersecting and oriented perpendicular to the fibers in at least a second subset of the second adjacent plurality of strips of prepreg within the second ply.

17. The method of claim 16, further comprising repeatedly fabricating plies, stacked upon one another, until a layup of the composite fan blade is complete.

18. The method of claim 17, wherein the first plurality of strips of prepreg includes at least one strip of prepreg that is staggered a longitudinal offset from an adjacent strip of prepreg in the first adjacent plurality of strips of prepreg.

19. The method of claim 18, wherein the second plurality of strips of prepreg includes at least one strip of prepreg that is staggered a lateral offset from an adjacent strip of prepreg in the second adjacent plurality of strips of strips of prepreg.

20. The method of claim 15, wherein a multi-axis robot is used to position the composite tooling mold relative to the AFP machine.

* * * * *